(12) United States Patent
Benn

(10) Patent No.: US 10,044,311 B2
(45) Date of Patent: Aug. 7, 2018

(54) INRUSH LIMITER FOR MOTOR DRIVE AC/AC POWER CONVERTERS

(71) Applicant: Hamilton Sundstrand Corporation, Charlotte, NC (US)

(72) Inventor: Andrew J. Benn, Birmingham (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/069,221

(22) Filed: Mar. 14, 2016

(65) Prior Publication Data

US 2016/0268949 A1 Sep. 15, 2016

(30) Foreign Application Priority Data

Mar. 12, 2015 (GB) .................... 1504161.9

(51) Int. Cl.
*H02P 3/00* (2006.01)
*H02P 27/06* (2006.01)
*H02M 1/36* (2007.01)
*H02M 5/458* (2006.01)

(52) U.S. Cl.
CPC .............. *H02P 27/06* (2013.01); *H02M 1/36* (2013.01); *H02M 5/4585* (2013.01)

(58) Field of Classification Search
CPC ............................ H02P 27/06; H02M 5/4585
USPC ....................................................... 318/504
See application file for complete search history.

(56) References Cited

U.S. PATENT DOCUMENTS

| 4,761,600 | A | * | 8/1988 | D'Atre | .................... | H02P 23/06 |
|---|---|---|---|---|---|---|
| | | | | | | 318/758 |
| 4,879,639 | A | * | 11/1989 | Tsukahara | ............... | H02P 23/06 |
| | | | | | | 318/803 |
| 6,038,155 | A | | 3/2000 | Pelly | | |
| 6,144,190 | A | * | 11/2000 | Scott | ................... | H02M 5/4585 |
| | | | | | | 322/25 |
| 2004/0090200 | A1 | | 5/2004 | Youm | | |
| 2007/0013332 | A1 | | 1/2007 | Grbovic | | |
| 2011/0007530 | A1 | * | 1/2011 | Swamy | .................. | H02M 1/36 |
| | | | | | | 363/37 |
| 2013/0208515 | A1 | | 8/2013 | Swamy | | |

FOREIGN PATENT DOCUMENTS

| CN | 2886911 Y | 4/2007 |
|---|---|---|
| EP | 1288060 A1 | 3/2003 |
| EP | 1538733 A2 | 6/2005 |
| EP | 2028755 A2 | 2/2009 |
| WO | 2011139269 A1 | 11/2011 |

OTHER PUBLICATIONS

Great Britain Search Report for application No. GB1504161.9; dated Oct. 6, 2015, 5 pages.
European Search Report for Application No. 16154029.9-1809 dated Jul. 29, 2016 6pages.

* cited by examiner

*Primary Examiner* — Eduardo Colon Santana
*Assistant Examiner* — Gabriel Agared
(74) *Attorney, Agent, or Firm* — Cantor Colburn LLP

(57) ABSTRACT

A variable frequency motor drive system configured such that the dc link capacitor charge is increased gradually, thus avoiding the above-mentioned transients. In the most preferred embodiment, the present invention ensures a gradual increase in the rectified voltage by providing the rectifier as a half-controlled thyristor rectifier (SCR) in place of the standard diode rectifier.

1 Claim, 11 Drawing Sheets

INRUSH LIMITER FOR MOTOR DRIVE AC/AC POWER CONVERTERS

This application claims priority to Great Britain Patent Application No. 1504161.9 filed Mar. 12, 2015, the entire contents of which is incorporated herein by reference.

TECHNICAL FIELD

The present invention relates to variable frequency motor drives and, more particularly, circuitry for limiting the effects of inrush current in such motor drives.

BACKGROUND OF THE INVENTION

In recent times, advances in alternate current (AC) motor drives have allowed for an increased use in aerospace applications. The drives themselves have become more advanced, however the key to further successful integration of electrical motor drives in aerospace applications is increased power to weight, power to size and thermal performance.

Such drives generally comprise a rectifier for rectifying the AC input to direct current (DC). The DC power is provided to an inverter which converts the DC voltage to AC to drive the motor with varying levels of voltage and current, according to control circuitry.

In most such drive systems, the rectified voltage has some ripple and this is filtered using capacitor/inductor circuitry to provide a relatively smooth DC voltage to the inverter.

Such known rectifier/inverter drive systems are known to suffer from a high initial inrush current. Start-up transients can be harmful to the system—significant switching transient may occur upon applying power to the rectifier. Such inrush currents are surge currents and can cause components of the drive system to fail and/or may also create electromagnetic interference that could interfere with other equipment in the power system and lead to catastrophic failure.

It is generally required, therefore, that such motor drives have a limit on the maximum allowable inrush current which usually means that the motor drive has to have a pre-charge circuit. This pre-charges the capacitance in the DC line to avoid a large inrush current at the moment the rectifier receives AC power.

Known systems for preventing adverse effects of such an inrush current seek to establish a high impedance path between the AC line voltages and a capacitance in the DC link between the rectifier and the converter.

There are various known ways of incorporating such high impedance in the DC link between the rectifier and the converter.

Some systems incorporate a pre-charge circuit including a resistor and a contact switch connected in parallel in the DC link.

Other known systems incorporate a pre-charge circuit comprising a series resistance to charge the DC link capacitance and a parallel thyristor which shorts out the resistor once a pre-set DC link voltage has been achieved.

Whilst such circuitry is effective in avoiding the adverse effects of surge currents there is still generally a significant current spike at the point the parallel thyristor is fired, dependent on the voltage difference between the DC link voltage and the rectified voltage.

Further, the additional circuitry adds additional complexity and cost to the drive system. Also, the pre-charge circuitry components are only required for the pre-charge part of the procedure, which is a relatively short time and once this pre-charge cycle is complete, these components are, effectively, dead weight.

FIG. 1 shows the generic topology for a variable frequency motor drive such as is commonly used in aircraft, for example.

With reference to FIG. 1, in very general terms, AC power is provided to the rectifier which converts three-phase AC into a DC voltage that has some ripple.

The rectifier usually comprises a number of diodes, e.g. silicon rectifier diodes. The diodes allow current to flow only in one direction when positively biased.

This results in a rectifier output of DC voltage. As mentioned, this output will have ripple.

The rippled DC voltage is then provided to a so-called DC link comprising a DC inductor and a parallel capacitor. The DC link circuitry smooths the rippled DC rectified output and acts, effectively, as a power storage facility for the inverter part of the drive (described below).

Although only one capacitor is shown it is also possible to use a number of capacitors to create the DC link capacitance. The DC link voltage is an essentially constant voltage.

The circuit shown in FIG. 1 also includes a brake circuit. Such circuits are required in applications where regeneration of energy to the supply is not permitted. This circuit includes transistors known as brake IGBTs. This dynamic brake circuit monitors the DC link voltage and the brake IGBT fires when the DC link voltage rises too high.

The final part of the drive circuit is the inverter. Each IGBT (Insulated Gate Bipolar Transistor) controls the application of the DC voltage to the output terminal, in the case of a motor drive the output terminals supply voltage and current to the motor. Various AC or DC waveforms can be produced for correct motor drive by the appropriate gate signals to each of the IGBTs. The gating signal may be created by a pulse width modulation (PWM) control scheme.

The pre-charge circuitry is provided by a series resistance and a pre-charge thyristor. If a pre-set DC link voltage is exceeded, the resistor is shorted out by the pre-charge thyristor. In other words, the pre-charge resistor limits the inrush current until the DC link capacitance has charged to a given voltage level. Once this level has been reached, the control circuitry fires the pre-charge thyristor and allowing system currents to bypass the resistor. This restricts the inrush of current to the capacitance in the DC link, allowing the capacitor(s) to charge up relatively slowly, rather than being suddenly charged due to the sudden application of supply voltage.

The series resistor enables the capacitors to charge relatively slowly. The thyristor is, effectively, a bypass switch for the resistor triggered after the pre-charge cycle allowing higher DC link currents to flow with minimal voltage drop. The thyristor once triggered will continue to conduct for as long as it has a positive current flow.

Thus, when main power is applied to the discharged drive system, the pre-charge circuit commences, applying DC current through the resistor to relatively slowly charge the capacitance in the DC link. When this capacitance is charged to the DC voltage minimum value, the thyristor is activated and there is, therefore, minimal surge acting on the capacitor and other series components including the rectifier diodes.

In more detail, the DC-link voltage is monitored by control circuitry such that the pre-charge thyristor is fired once a pre-determined voltage has been reached. The voltage at which the thyristor is fired, 'turned on', must be carefully selected to be both below the minimum nominal supply voltage and also minimise the differential voltage between the rectified supply and DC-link.

Thus the firing voltage is selected by considering the minimum DC-link voltage, in the case of a three phase system this voltage can be found by:

$$V_{DC} = 1.35\sqrt{3} \times V_{ph(rms)} \qquad \text{Eq 1}$$

The pre-charge resistance value must be carefully selected. During the pre-charge period, the DC-link circuit can be considered as a 2nd order series RLC circuit which is excited by a step voltage. To prevent resonant oscillations of the DC-link voltage, it is necessary to select the pre-charge resistance such the 2nd order transfer function has a damped response. From Eq 2 a value of resistance can be found to ensure a damping factor $\zeta > 2$, this gives a minimum pre-charge resistance.

$$\zeta = \frac{R}{2}\sqrt{\frac{C}{L}} \qquad \text{Eq 2}$$

Assuming a heavily damped response, the RLC circuit can be simplified to an RC circuit. The voltage at a given time can be found using the step response:

$$V_{DC}(t) = V_{in}\left(1 - e^{-\frac{t}{RC}}\right) \qquad \text{Eq 3}$$

Where $V_{in}$ is the rectified voltage, R is the pre-charge resistance and C is the DC-link capacitance. Customer requirements for the maximum pre-charge time then drive the maximum pre-charge resistance, variation and tolerance of the RC network needs to be considered.

A resistance is selected to give the required pre-charge time considering variation of +/−10% and +/−5% on the nominal DC-link capacitance and pre-charge resistance, respectively, along with abnormal and normal supply voltage ranges.

FIG. 2 shows a simulation result of pre-charge operation given nominal parameters and minimum supply frequency. It can be seen that the DC-Link pre-charge thyristor is fired at 30.4 ms once the DC-link voltage has reached the pre-determined threshold.

Despite the use of a pre-charge circuit there is still a secondary inrush current when the pre-charge thyristor has fired due to the remaining voltage difference between the rectifier and DC link capacitance. In FIG. 2 this inrush current has a maximum value of 79.8 A. In certain conditions the inrush current can be much greater.

The power dissipated in the resistor during a pre-charge cycle is a key sizing factor for the resistor.

Power dissipated in the resistor is a function of resistance and the square of the current. So shorter charging times which require a higher current have higher power dissipation.

$$P = I^2 R \qquad \text{Eq 4}$$

Longer pre-charge times result in a low power rating and smaller components but system design and customer requirements often call for short pre-charge times increasing component size.

The power and energy dissipation in the pre-charge resistor for a typical application is shown in FIG. 3. This shows a peak power of 620 W and a pulse energy of 4.78 J.

FIG. 4 shows power dissipation under the condition where an over-voltage transient occurs at the same instant that the 3-phase network is connected to the MDE. Here, energy dissipation is shown to be 8.7 J while the peak power is 1387 W over the pre-charge period.

Momentary power interruptions may cause multiple pre-charge cycles in quick succession, increasing the stress on the resistor.

For the power dissipation described above a 50 W, wire-wound, aluminium cased, power resistor from could be selected for the pre-charge resistor. The manufacturer's datasheet gives its short duration (<0.1 s) energy withstand as 20 J.

Once the pre-charge period has been completed, the pre-charge thyristor is fired and the full system current must flow through this component as well as the rectifier diodes. The conduction losses of these devices increase the losses of the system and adds to the difficulty in thermal management.

SUMMARY

According to one embodiment, a variable frequency motor drive is disclosed. The motor drive includes a rectifier for receiving AC input and for providing a dc output and an inverter for providing an AC output from the rectifier dc output for driving a motor. The motor drive also includes control circuitry to control the application of the AC output to the motor and a dc link between the rectifier and the inverter, the dc link comprising a capacitor; wherein the rectifier is configured to charge the capacitor gradually.

One or more embodiments limit inrush current and its adverse effects on the components of the motor drive, but without the need for the pre-charge components described above for conventional systems, whilst still minimising current stress on the remaining components.

Such embodiments may achieve this by configuring the drive system such that the capacitor charge is increased gradually, thus avoiding the above-mentioned transients.

In one embodiment, the present invention ensures a gradual increase in the rectified voltage by providing the rectifier as a half-controlled thyristor rectifier (SCR) in place of the standard diode rectifier.

BRIEF DESCRIPTION OF DRAWINGS

Preferred embodiments will now be described, by way of example only, with reference to the drawings.

DETAILED DESCRIPTION OF THE INVENTION

The preferred SCR uses a thyristor on the positive leg of each rectifier phase, which allows for the controlled commutation of each phase. The same effect may be achieved by using thyristors on the negative leg of each rectifier phase or by a fully controlled rectifier. With phase angle control of the SCR, the rectified voltage can be gradually increased over a defined period, thus controlling the DC link and AC line currents to a desired value, without surges.

The phase angle control algorithm can be implemented by FPGA, microprocessor or discreet devices.

Figure 1:
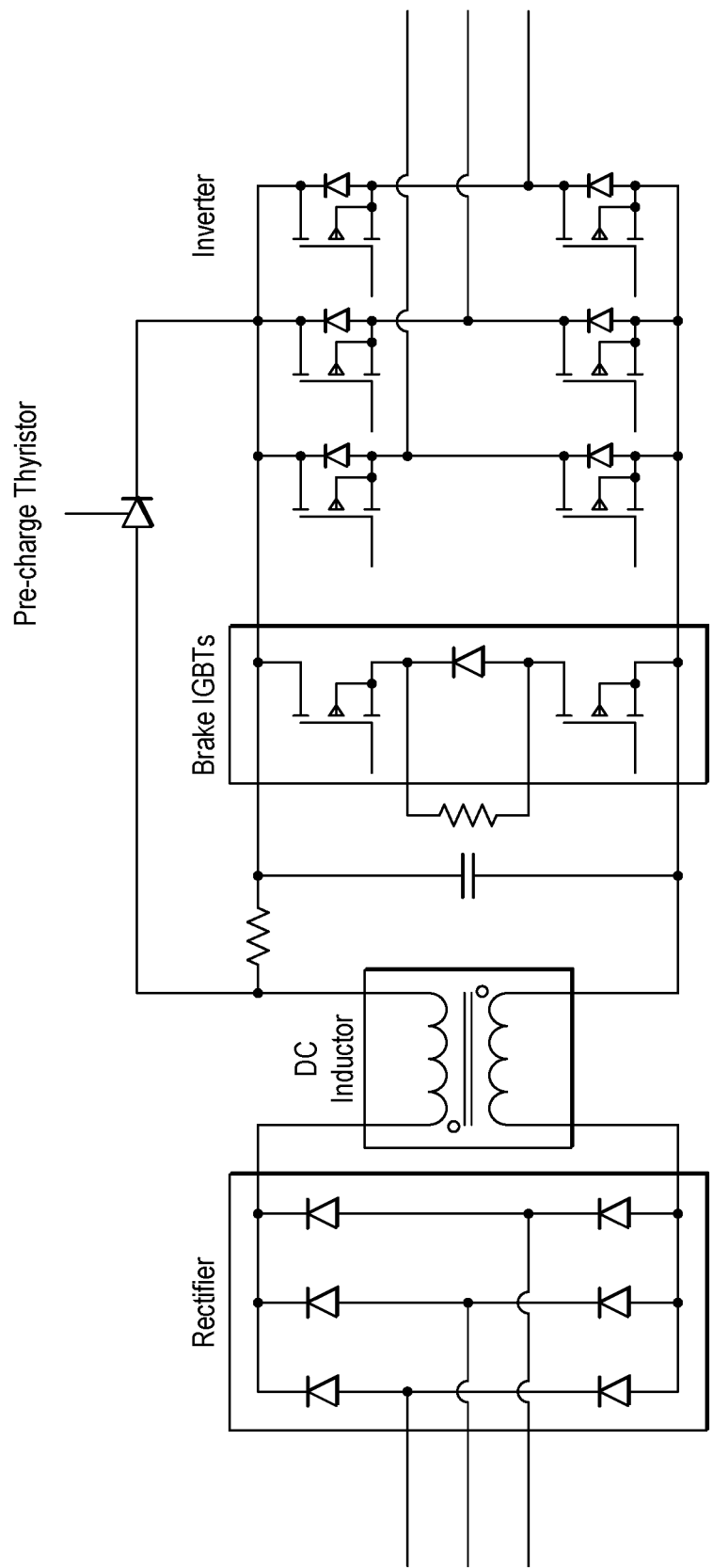
FIG. 1 is a block diagram of a known motor drive circuit.
Figure 2:
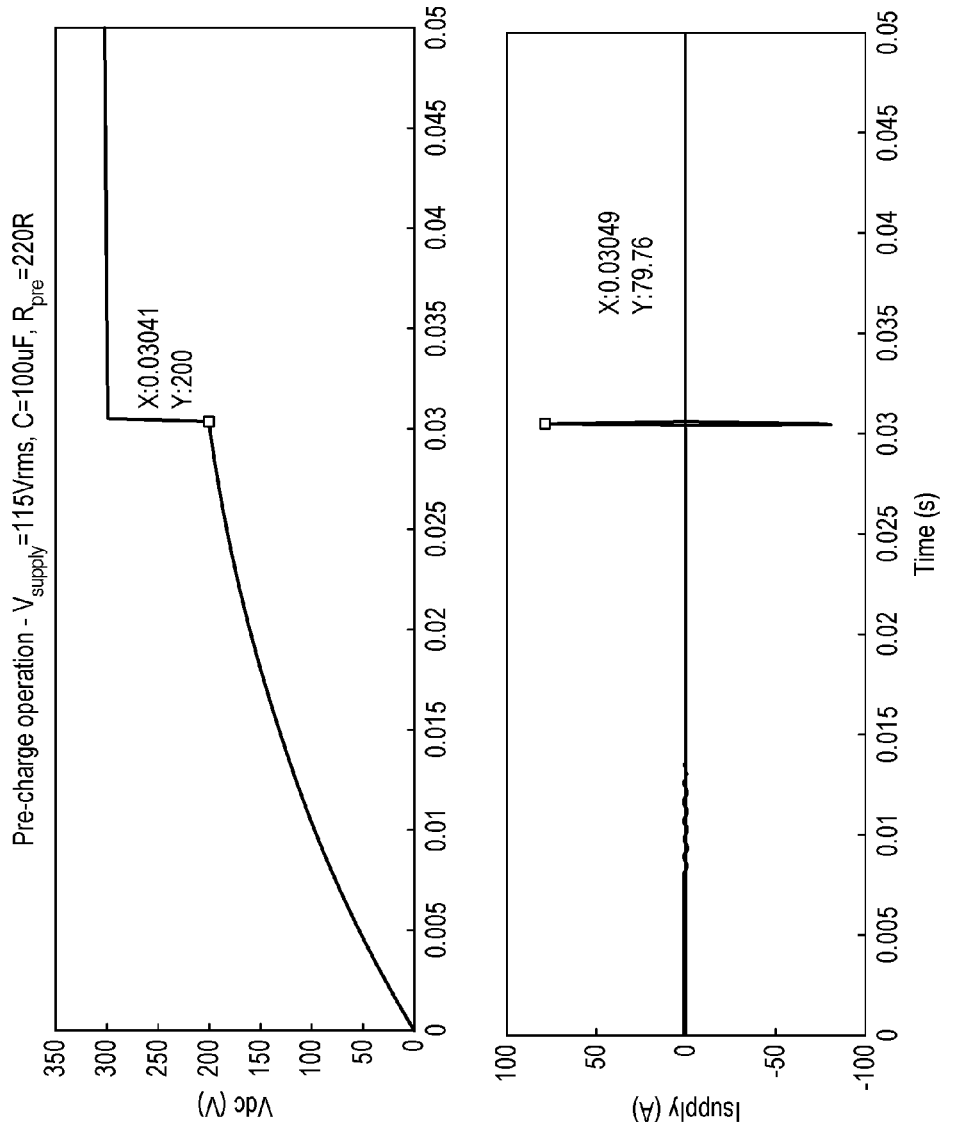
FIG. 2 shows the voltage and current during pre-charge operation of a known motor drive.
Figure 3:
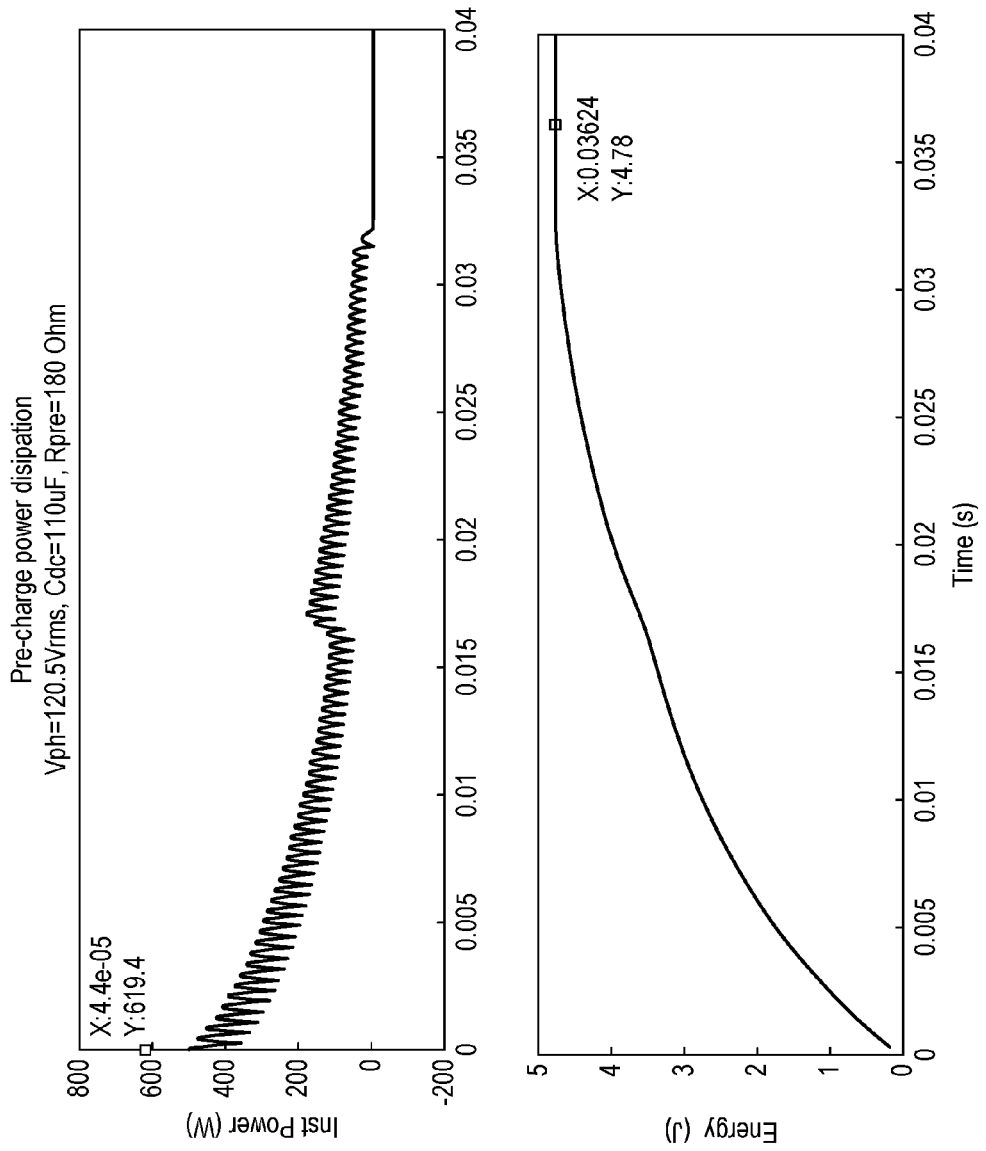
FIG. 3 and FIG. 4 show resistor power dissipation during pre-charge operation of a known motor drive.
Figure 4:
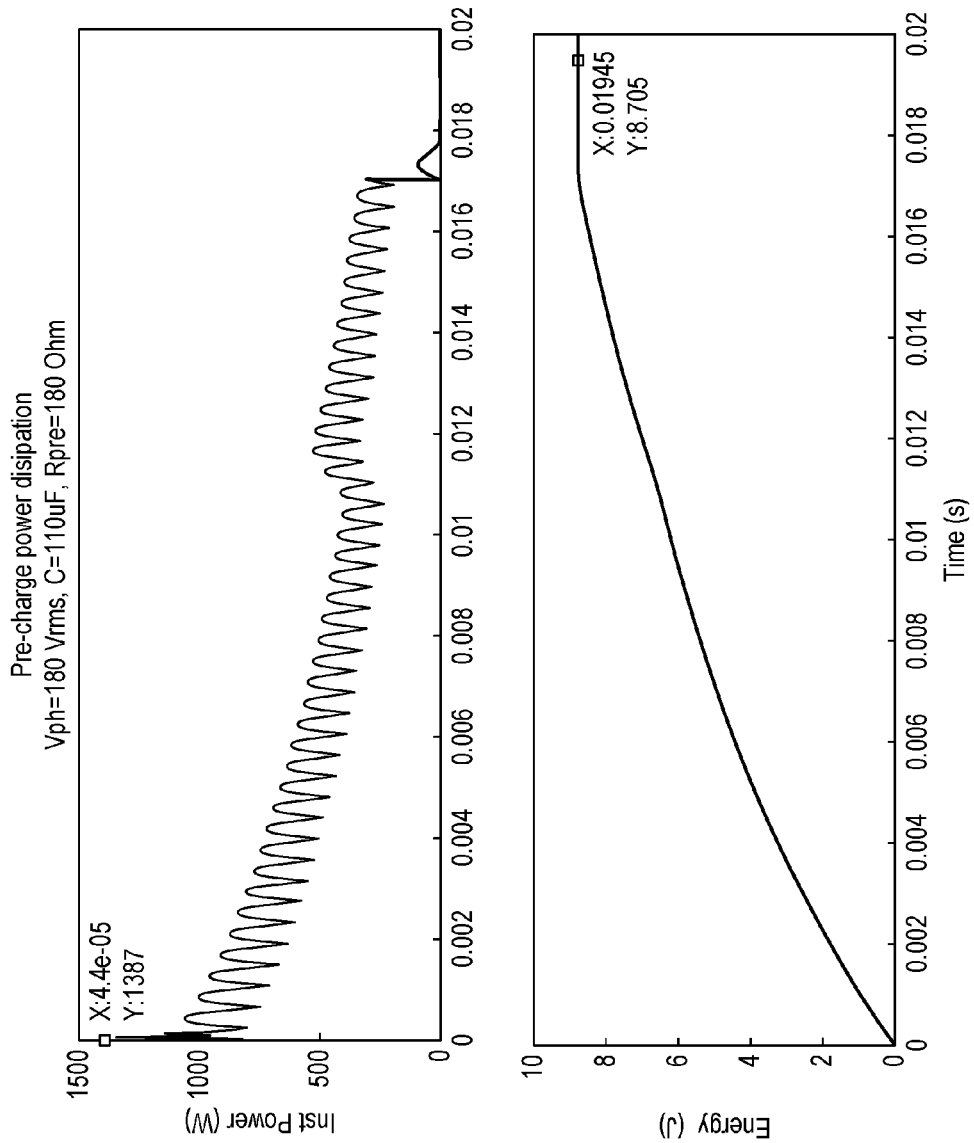
Figure 5:
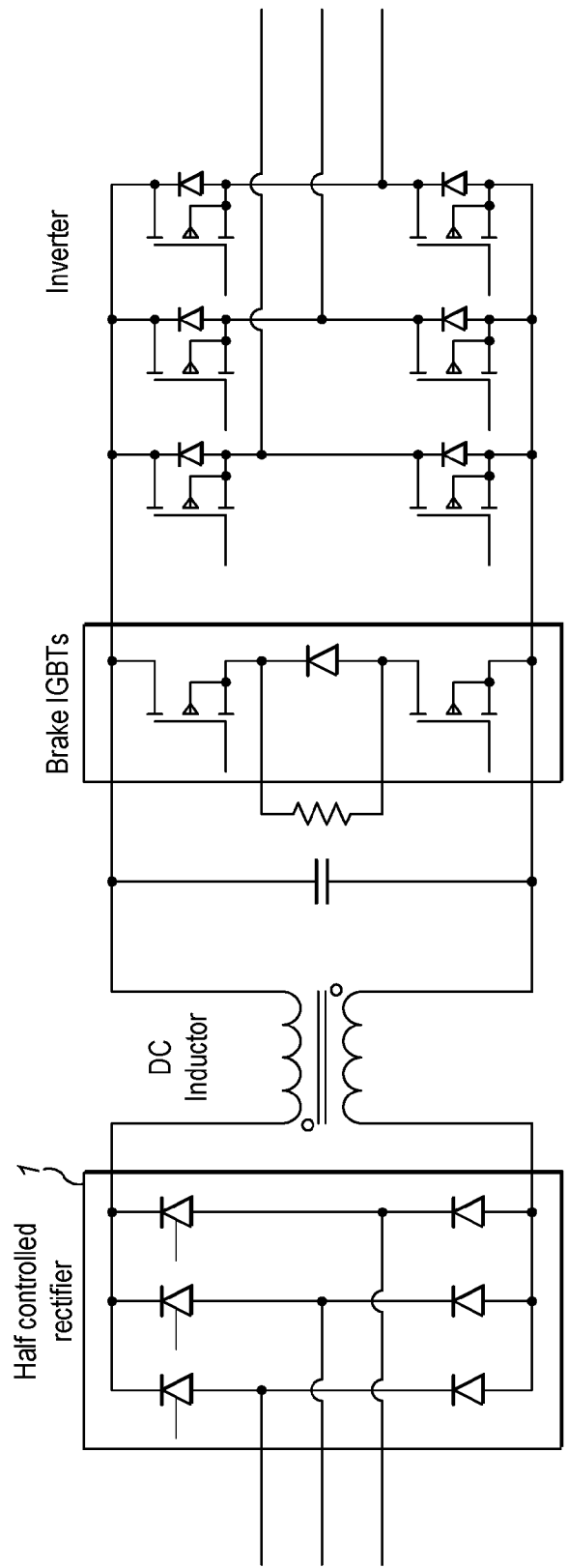
FIG. 5 shows a block diagram of a motor drive circuit according to the invention.

FIG. 5 shows the topology for a controlled rectifier according to the present invention. It can be seen that the series resistor and parallel thyristor of the existing system is no longer required, due to the use of a modified rectifier design—i.e. using a half-controlled rectifier.

Figure 6:
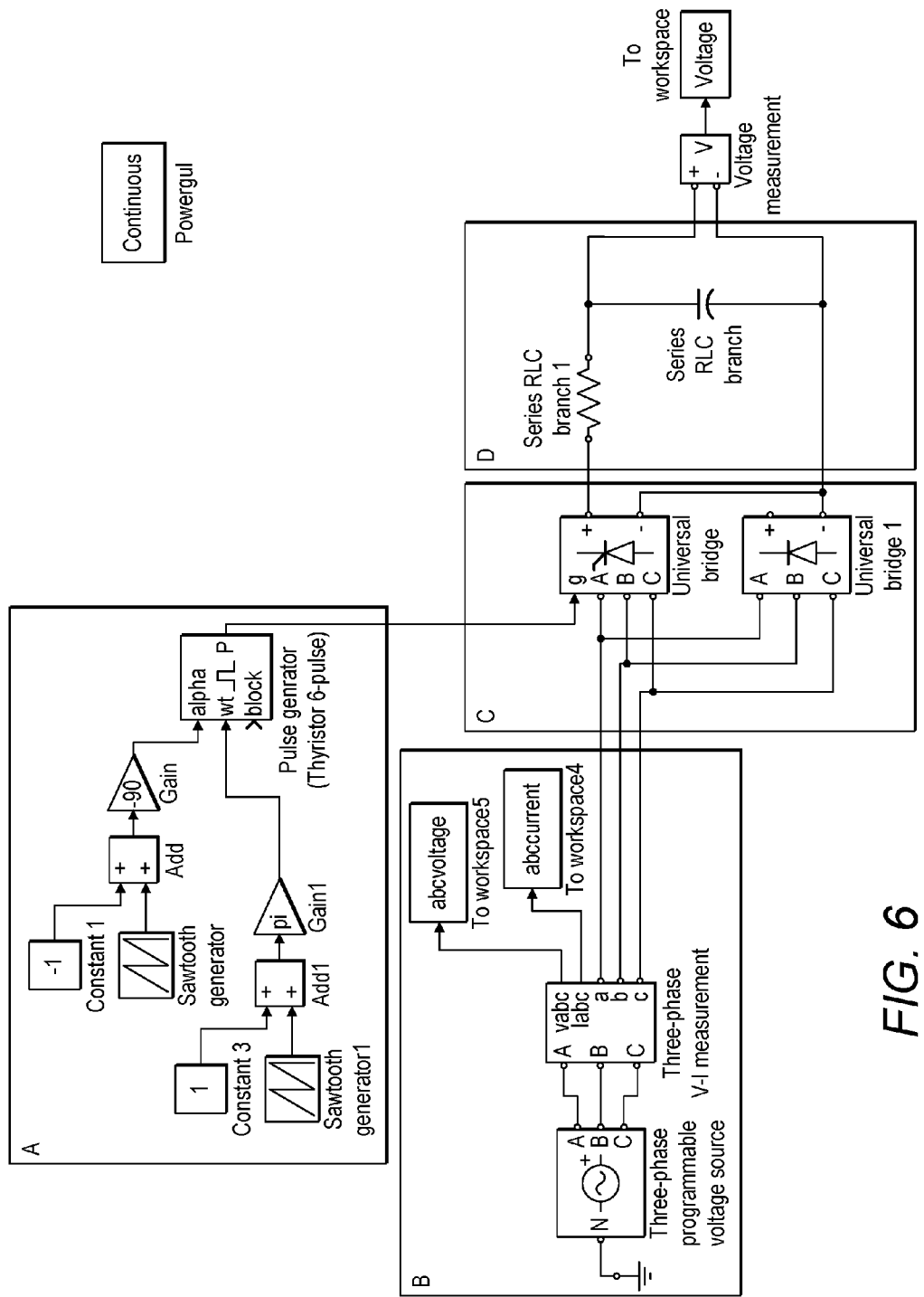
FIG. 6 shows a possible implementation of the invention.

FIG. 6 shows a possible implementation, created using simulation software, of the invention, split into sections each relating to a specific function. Block A is a control system synchronised with the supply frequency and providing the gating signals to the rectifier thyristors. In this implementation the gate phase angle is determined by a negative ramp generator which moves the phase angle from 270 to 0 degrees over a user defined time. Other control schemes are available including closed loop voltage or current control.

Block B represents the AC supply to the motor drive, in this case a three phase source has been used however a single phase system would work in a similar way.

Block C implements the half controlled rectifier according to the details of this invention. Thyristor controlled phase legs are provided on the upper side of the rectifier but could also be provided in the lower side or both.

Block D is a very simplistic implementation of a DC link including a capacitor. A resistance has been included but its value is representative of tracking and capacitor connection resistance only.

The pre-charge cycle begins when an AC supply is provided. The controller will synchronise with the supply voltage, phase and phase rotation to ensure the correct timing of gate signals. At the start of the pre-charge period the firing angle will be set to 270 degrees and this will decrease to zero over a set period of time. A maximum of 270 degrees is used as this represents the minimum voltage of each phase, the point at which no conduction is possible.

When a thyristor receives a firing pulse from the controller it will conduct for as long as it has positive flowing current. The point at which the thyristor is fired during the AC cycle will determine the rectifier voltage available to drive current into the DC link capacitance. During the thyristor conduction the DC link capacitance will charge and the voltage will increase. Because the supply is AC the current will decay to zero and the thyristor will stop conducting, current flow will only resume on the next firing pulse to one of the thyristors.

This gradually increases the DC link voltage and limits the inrush current.

Figure 7:
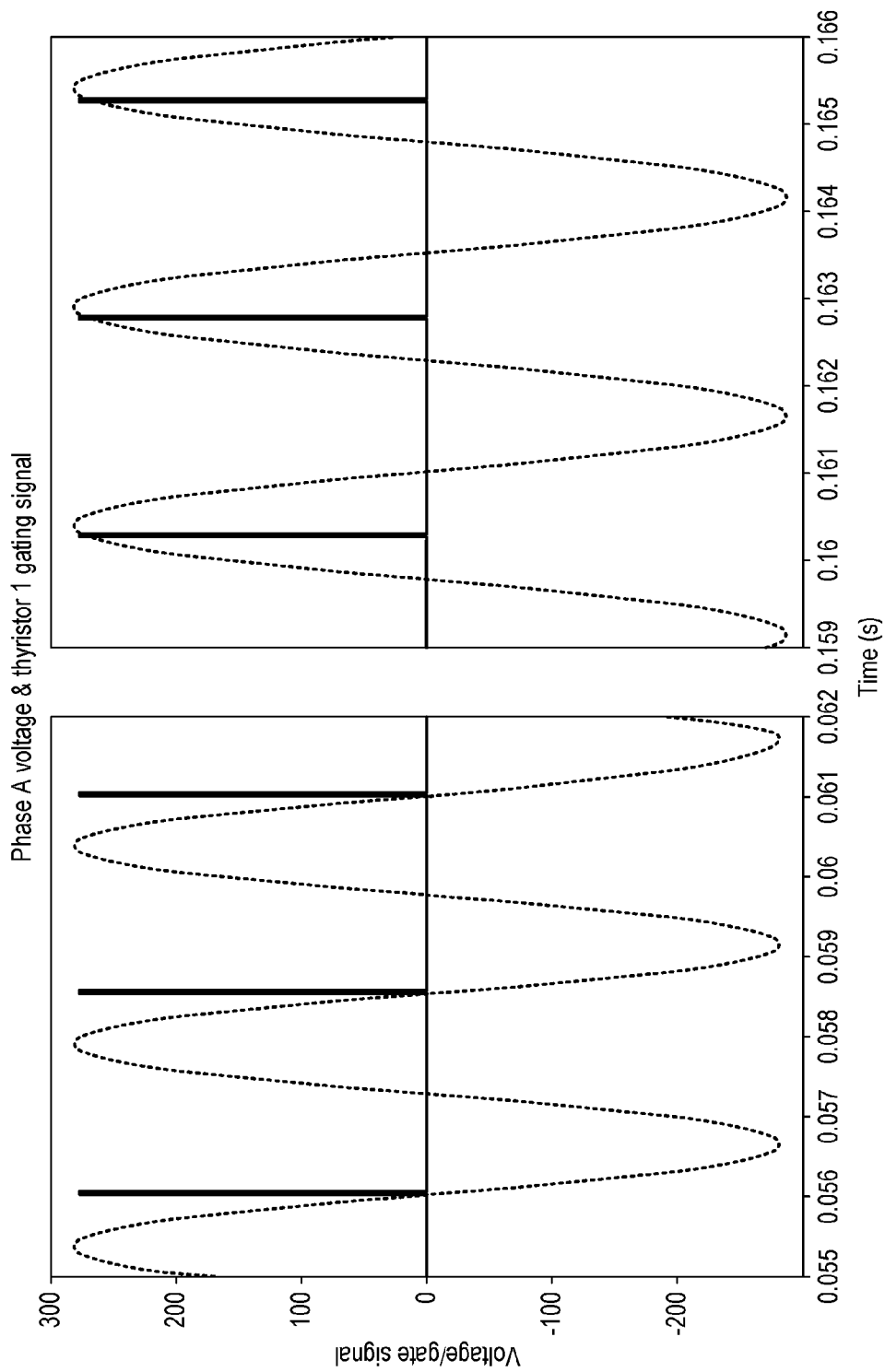
FIG. 7 shows synchronised firing signals for a phase A thyristor for the example of FIG. 6.

FIG. 7 shows phase A and the synchronised firing signals for the phase A thyristor. The left and right plot demonstrates how the firing angle decreases during the pre-charge cycle.

Figure 8:
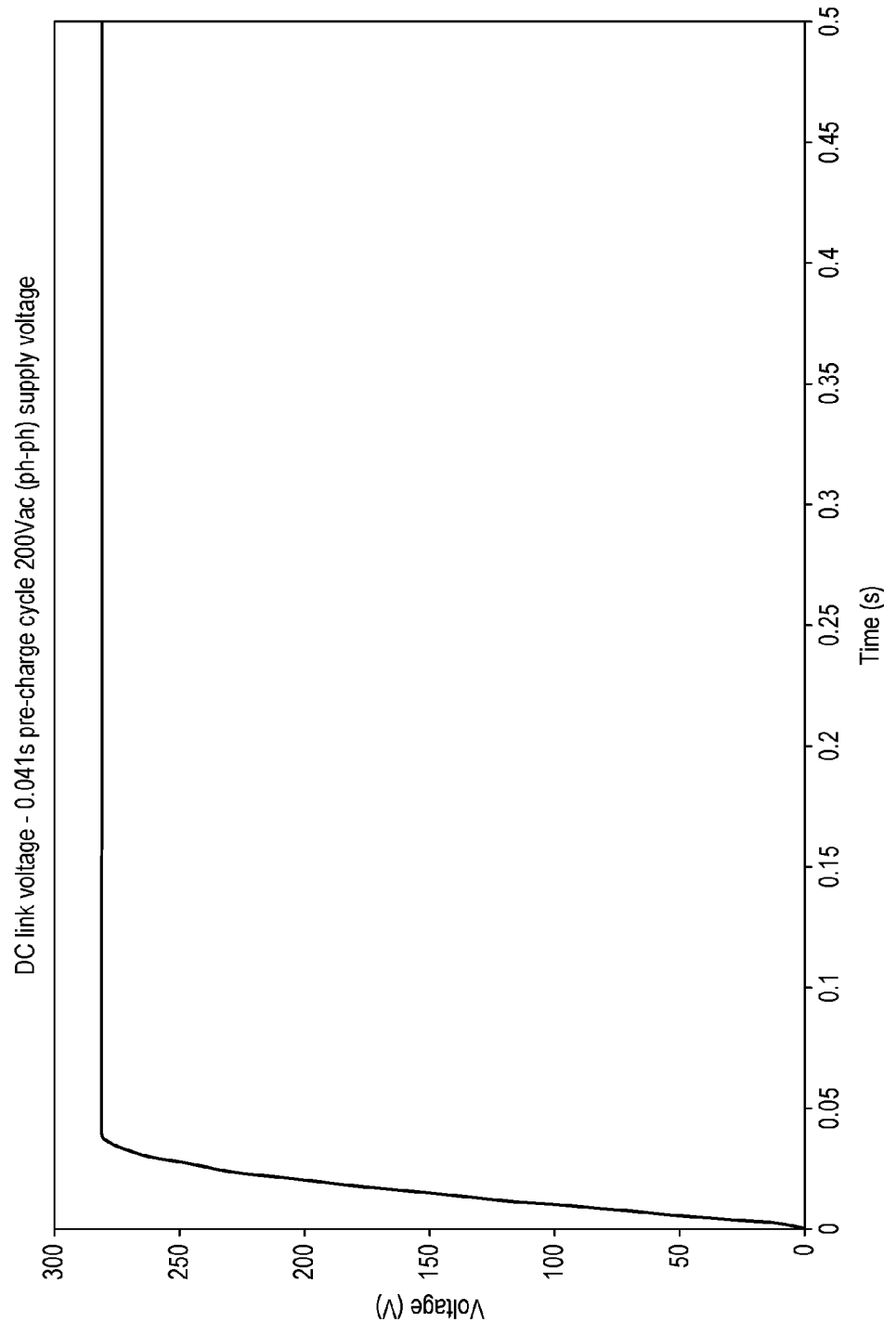
FIG. 8, FIG. 9 and FIG. 10 show how the dc link voltage gradually increases under phase angle control.
Figure 9:
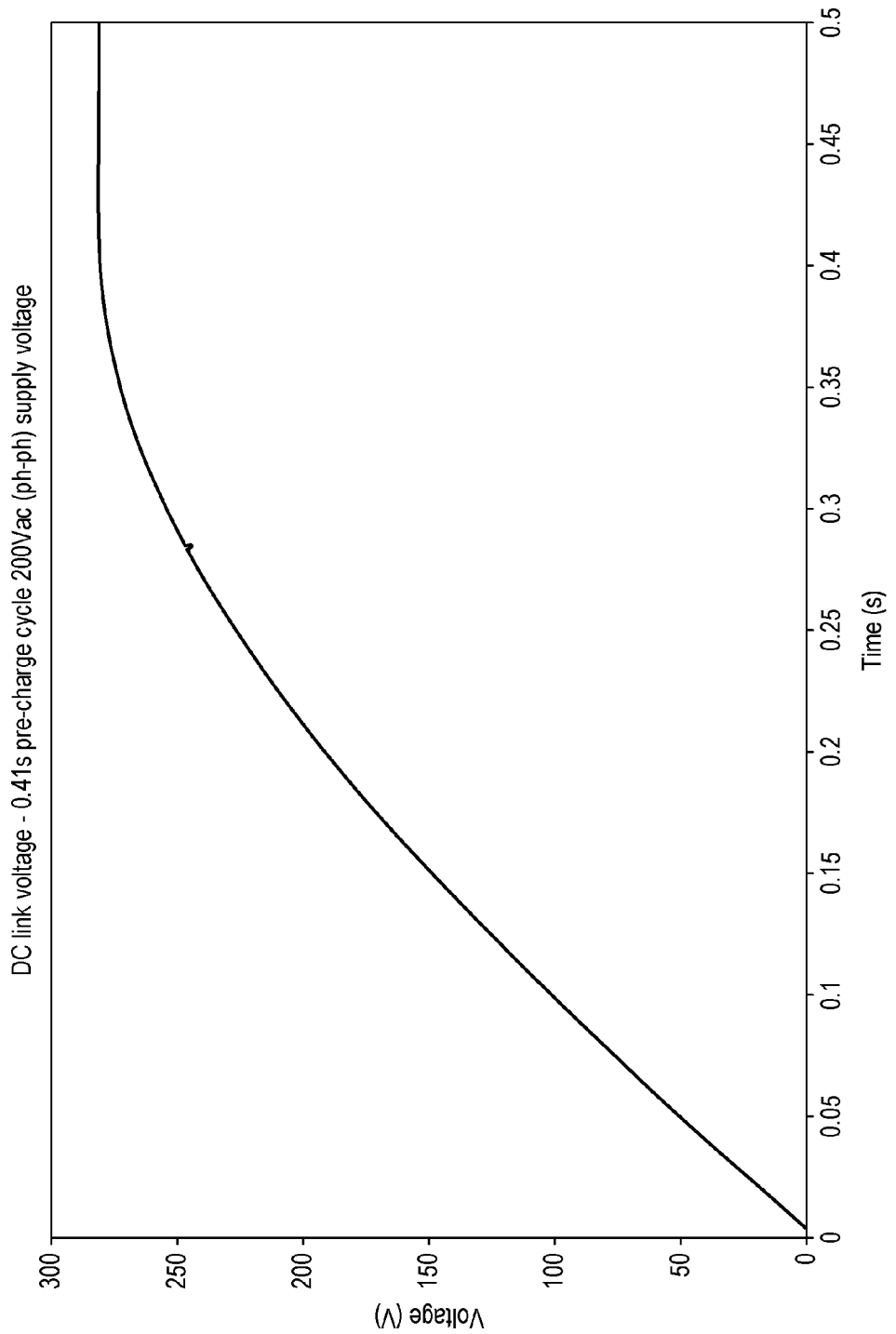
Figure 10:
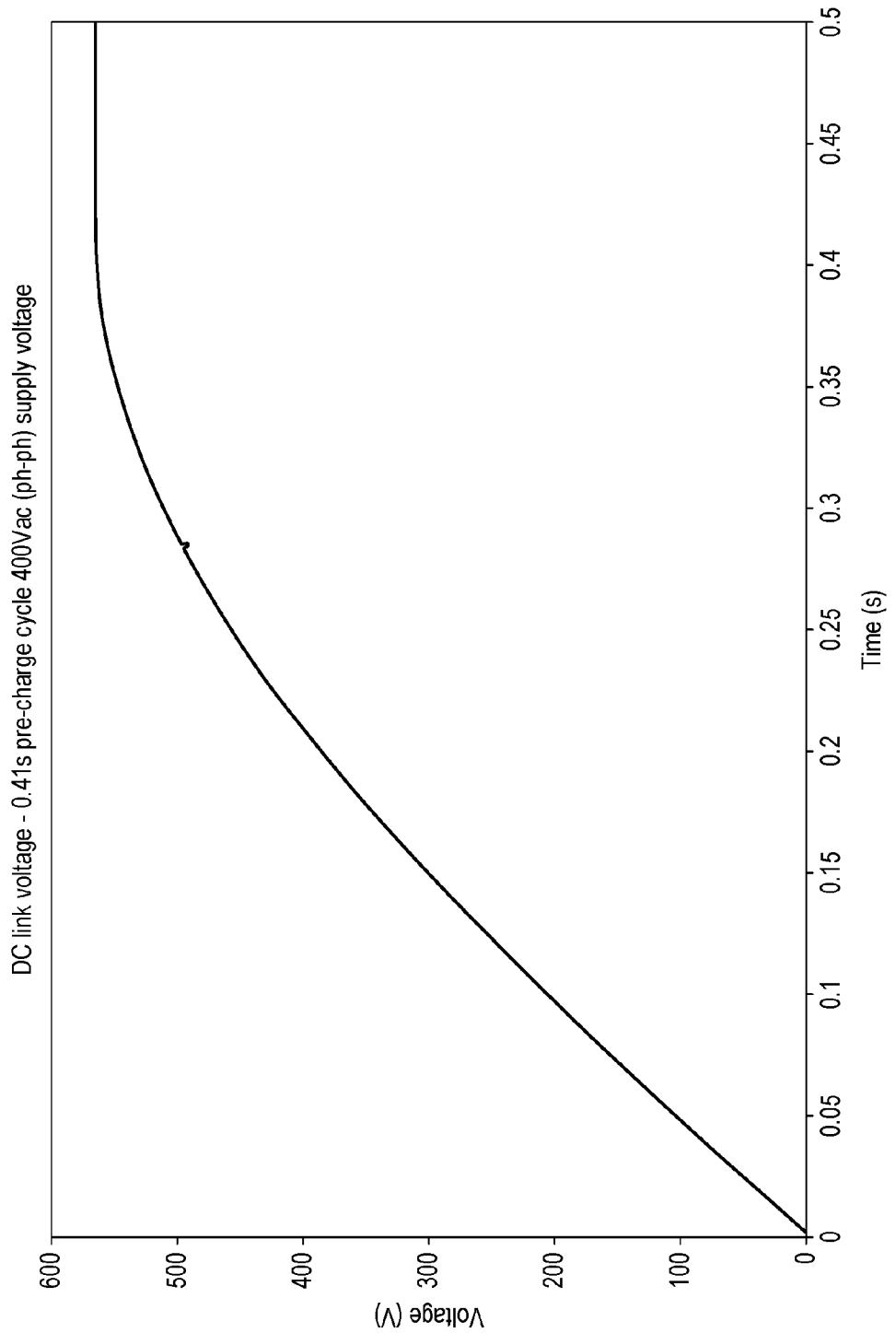

As the firing angle decreases the DC link voltage will increase to a point where the capacitance is fully charged. This limits the inrush current and also eliminates the secondary inrush. FIGS. 8, 9 and 10 all show the DC link voltage gradually increasing under phase angle control.

FIG. 8 shows a fast pre-charge time of 0.041 s while FIGS. 9 and 10 show a slower pre-charge of 0.41 s, demonstrating the ability to define the pre-charge time of the system. In addition FIG. 10 shows operation at a higher voltage and in FIGS. 8 and 9, demonstrating that the charge time is independent of the source voltage.

Figure 11:
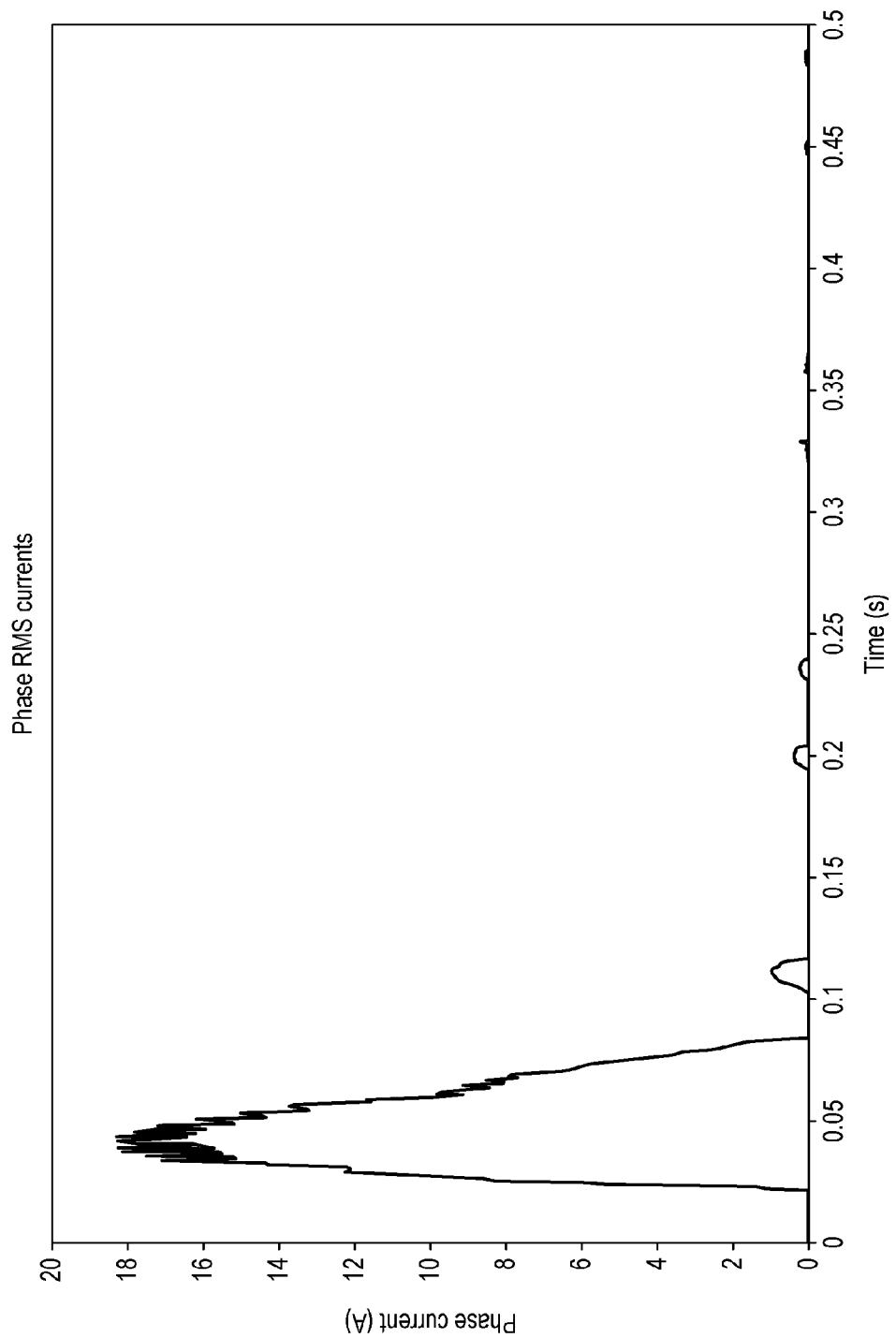
FIG. 11 shows the 3-phase current for a pre-charge cycle.

FIG. 11 shows the 3-phase current for a pre-charge cycle demonstrating the success of the current limiting function. The current has a peak value of 18 A in this example.

The half-controlled rectifier circuit of the invention limits the inrush current by actively controlling the 3-phase or single phase current from the supply. This removes the dead weight and space of the pre-charge resistor which is only used during pre-charge. The circuit is scalable and can be used on several designs with a minimum design effort, the pre-charge time can be fully electrically controlled to suit customer requirements. In addition as the thyristors have a low forward voltage during conduction the pre-charge losses are lower improving thermal performance and robustness.

A reduction in power components also reduces the high power tracking and harnessing required.

The invention claimed is:
1. A variable frequency motor drive comprising:
a rectifier for receiving AC input and for providing a dc output, wherein the rectifier is a half controlled rectifier including one or more thyristors;
an inverter for providing an AC output from the rectifier dc output for driving a motor;
control circuitry to control the application of the AC output to the motor, the control circuit providing gating signals to the one or more thyristors based on a firing angle;
a dc link between the rectifier and the inverter, the dc link comprising a capacitor;
wherein the rectifier is configured to charge the capacitor gradually; and
a brake circuit configured to monitor voltage of the dc link and control operation of the inverter;
wherein the phase angle is set to a maximum predetermined value at the start of a pre-charge cycle, and wherein the phase decreases over time, causing the dc output to increase until the capacitor is fully charged;
wherein the pre-charge cycle begins when the AC input is provided and the control circuit synchronizes the supply voltage, phase and phase rotation to ensure the correct timing of gate signals.

* * * * *